United States Patent [19]

Cornelissen

[11] 3,866,129

[45] Feb. 11, 1975

[54] DEVICE FOR THE DIGITAL SUBTRACTION OF FREQUENCIES

[75] Inventor: Bernardus Henricus Jozef Cornelissen, Emmasingel, Eindhoven, Netherlands

[73] Assignee: U.S. Philips Corporation, New York, N.Y.

[22] Filed: May 29, 1973

[21] Appl. No.: 364,891

[30] Foreign Application Priority Data

June 3, 1972 Netherlands ....................... 7207569

[52] U.S. Cl. .................. 328/133, 307/262, 307/271, 328/44, 328/158

[51] Int. Cl. ......................... H03b 3/04, H03d 13/00

[58] Field of Search ........ 307/262, 271; 328/16, 34, 328/39, 41, 133, 158, 159, 44

[56] References Cited

UNITED STATES PATENTS

| | | | |
|---|---|---|---|
| 3,626,307 | 12/1971 | Koyama | 328/133 |
| 3,634,771 | 1/1972 | Hermel | 328/133 |
| 3,656,063 | 4/1972 | Vollmer | 328/133 |
| 3,659,226 | 4/1972 | Angeleri et al. | 328/158 X |
| 3,735,324 | 5/1973 | Phillips | 328/133 |

*Primary Examiner*—John Zazworsky
*Attorney, Agent, or Firm*—Frank R. Trifari; George B. Berka

[57] ABSTRACT

A device for the digital substraction of two different frequencies includes means which reverse the phase of a wave-form of the signal of higher-frequency about 180° during its coincidence with one half-wave form of the signal of lower frequency and, subsequently, reverses the phase of another wave form of that signal about further 180° during its coincidence with the other half-wave of the lower frequency signal.

3 Claims, 7 Drawing Figures

DEVICE FOR THE DIGITAL SUBTRACTION OF FREQUENCIES

The invention relates to a device for the digital subtraction of signal frequencies which can be received on two inputs, comprising an output unit by which a signal wave can be generated in reaction to a command signal of a higher frequency, it being possible to block the said generating process for a given period of time by means of a command signal of a lower frequency. Many varieties of such devices are known. It may be that the frequencies arrive as two pulse sequences. It a pulse sequence of lower frequency arrives, it is detected and the next pulse of the sequence of higher repetition frequency is blocked. The non-blocked pulses are allowed to pass by the output unit. The output unit itself may comprise a pulseshaper, for example, as described in German Offenlegungsschrift No. 1,959,224. Therein, the leading edges of the pulse sequences make a counter count up or down, respectively. When the counter reaches a given position, sn output pulse is generated, A device of this kind operates satisfactorily, particularly if the two input frequencies differ only comparatively little, so that always one or more pulses of higher frequency are blocked before an output pulse is generated again. If the relative difference between the two input frequencies is large, a number of output pulses having the repetition time of the higher frequency appear, and subsequently one pulse is suppressed. This can be considered as an abrupt 360° phase change (to be referred to hereinafter as phase jump), and such large phase jumps are detrimental, notably if the output signal is used to achieve a substantially harmonic wave form. So as to improve this situation, the invention is characterized in that means are provided by means of which the phase jump represented by said time, occurring in each period of the signal of lower frequency, can be realized in at least two jumps which are separated from each other by at least one period of the output signal, in that delay means are provided by means of which the output unit can be temporarily activated in reaction to a first command signal of lower frequency so as to introduce a delay which is smaller than the period of the signal of higher frequency, it being possible for a second command signal of lower frequency to de-activate the delay means and to mask a signal wave. The phase jump is now divided into two parts, the sum of which is 360°. The invention can also be considered as being executed with time inversion: in that case one signal wave is masked, after which a number of signal waves are advanced in time. This is the same from a theoretical as well as from a practical point of view.

According to a preferred aspect of the invention, each of the said two jumps is approximately 180°. The maximum value of the phase jumps is thus halved. The phase jumps can be made smaller yet in the same manner by first changing over to the double frequencies, by subsequently using a device according to the invention, and by finally dividing the frequency of the output signal by two: in that case generally sets of four 90° phase jumps are obtained.

It is a further aspect of the invention that said means comprise a bistable element which can be set by the first command signal of lower frequency and the inverted value of the signal of higher frequency, and which activates the output unit in the set state in each period of the signal of higher frequency, with the result that a period of the output signal can be generated which is delayed with respect to the signal of higher frequency. Notably if both input signals are symmetrical, the time delay can thus be readily obtained. The said inverted value can also be considered as being delayed (or advanced in time) over 180°.

It is a further aspect of the invention that said means comprise a counter which counts up under the control of pulse edges of the signal of higher frequency, which counts down under the control of pulse edges of the signal of lower frequency, and which, when a given counting position is reached, for example the position 2, activates the output unit so as to generate an output pulse, the counting position then being reset. In contrast therewith, according to the said German Offenlegungsschrift No. 1,959,224 only the leading edges of the input signals are active: it will be demonstrated that this has drawbacks which are eliminated according to the invention.

The invention also relates to an electronic musical instrument, in particular an electronic organ, provided with an oscillator unit by which at least two oscillation frequencies can be generated, with a device for the digital subtraction of these two oscillation frequencies so as to form a source frequency, and with a frequency divider by means of which an audio frequency can be formed, the device for the digital subtraction being constructed according to the described aspects. Generally, source frequencies are formed which are each time lowered by one octave in tone by a sequence of successive two-dividers. The output signals must then be sufficiently harmonic: if they consist of pulse sequences the intervals between successive pulses must be sufficiently equal. It is known that this equality is relatively improved by successive dividing stages. All tones can then be derived from one oscillator. Assume that this oscillator has a frequency f; ¾ f is then formed by subtracting ¼ f therefrom. The shape of the signals is subsequently improved by dividing stages. However, as a result of the invention less dividing stages are required than previously because the shape of the source frequency already satisfies the imposed requirements better (smaller maximum phase jump). In this way components are saved. Moreover, the oscillator can operate at a lower frequency: it is usually easier to produce sufficient power at a lower frequency. On the other hand, using the same oscillator and the same number of dividing stages, the signal quality can be improved.

The difference frequency can also be utilized to guarantee an accuarate relationship with an other oscillation. This is possible, for example, in that an auxiliary oscillator comprising an auxiliary divider and a phase-sensitive detector are provided, an output frequency of the device for the digital subtraction being compared in the phase-sensitive detector with the output frequency of the auxiliary divider, the latter frequency being derived from the auxiliary oscillator frequency by division, it being possible to control the auxiliary oscillator by means of the output signal of the phase-sensitive detector so that an accurate phase relationship exists between this oscillator and the signal on an input of the device for the digital subtraction of frequencies, and hence also an accurate relationship between the various frequencies. Also in this case it is advantageous if no very large phase jumps occur in the input signal of the phase-sensitive detector.

The invention will be described in detail with reference to some figures.

Figure 1:
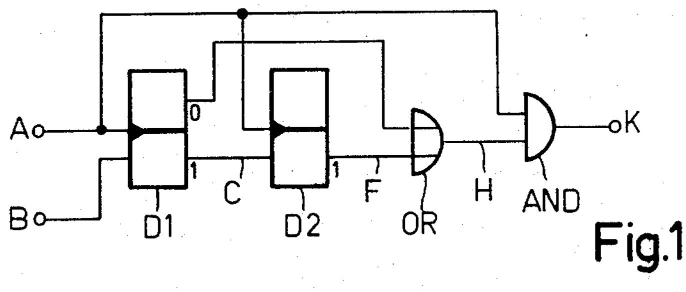
Fig.1 PRIOR ART
FIG. 1 shows a known device.
Figure 2:
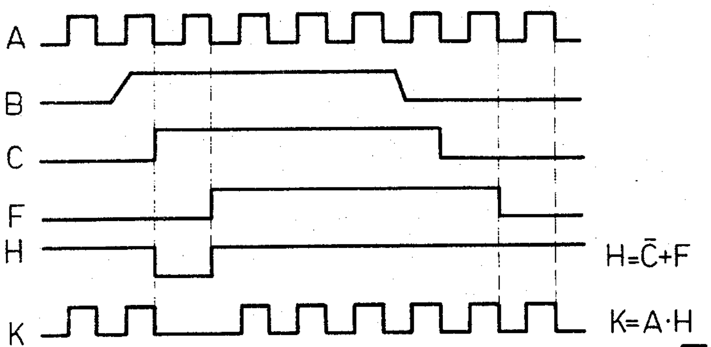
Fig. 2 PRIOR ART
FIG. 2 shows a diagram of the signal forms occurring therein.

FIG. 1 shows a known device, comprising two signal inputs A and B, two bistable elements (data flipflops) D1 and D2, one logic AND-gate AND, one logic OR-gate OR, and one output terminal K. The logic functions of the gates and the signals which appear are shown in FIG. 2. The comparatively high frequency of FIG. 2A, represented here as a symmetrical signal, arrives on terminal A. The comparatively low frequency of FIG. 2B arrives on terminal B. If the signal on terminal A changes from high to low, the bistable element D1 assumes the logic state of the signal on terminal B. If terminal B is high at this instant, the 1-output C of D1 also becomes high and the 0-output C becomes low. If the 1-output F of the bistable element D2 becomes low at this instant, both inputs of the logic OR-gate OR will now be low, with the result that its output H (FIG. 2H) also becomes low and the logic output K of the AND-gate AND is low. The next high input pulse on terminal A does not change the low output H of the OR gate and, consequently the low output an terminal K is maintained If the signal on terminal A becomes low again at the end of this pulse, while the output signal C of D1 is high, the bistable element D2 assumes the logic state of the signal C on its output F (FIG. 2C) so that its 1-output becomes high, output H of the the logic OR-gate OR also becomes high so that the output K of the AND gate remains low. If the signal on terminal B becomes low, the 0-output of the bistable element D1 becomes low in reaction to the next trailing edge of the signal on terminal A. The logic OR-gate OR then receives two high input signals. In reaction to the next trailing edge of the signal on terminal A, the bistable element D2 is changed over so that its 1-output becomes low. The initial situation is then reached again. The absence of one of the pulses of as shown in FIG. 2K makes it evident that the output signal K has indeed the correct difference frequency. On the other hand, the absence of a pulse implies a 360° phase jump. This is undesirable for a variety of applications, for example, if the output signal must resemble an harmonic oscillation as much as possible, as is desirable for frequency control systems and other non-digital applications.

Figure 3:
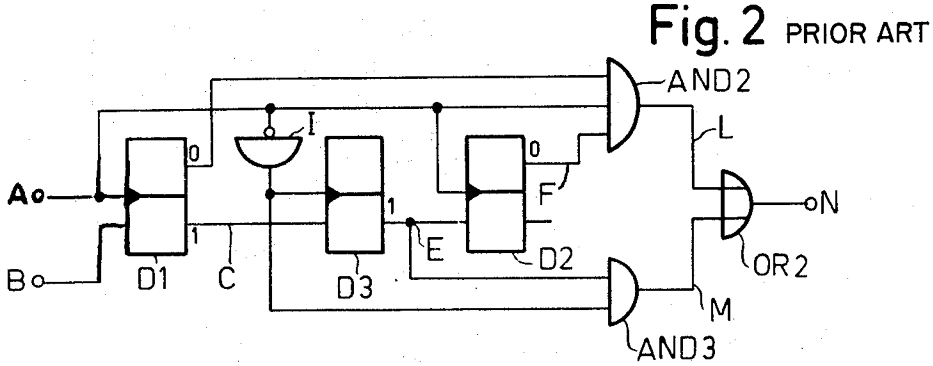
FIG. 3 shows a first embodiment of the device according to the invention.
Figure 4:
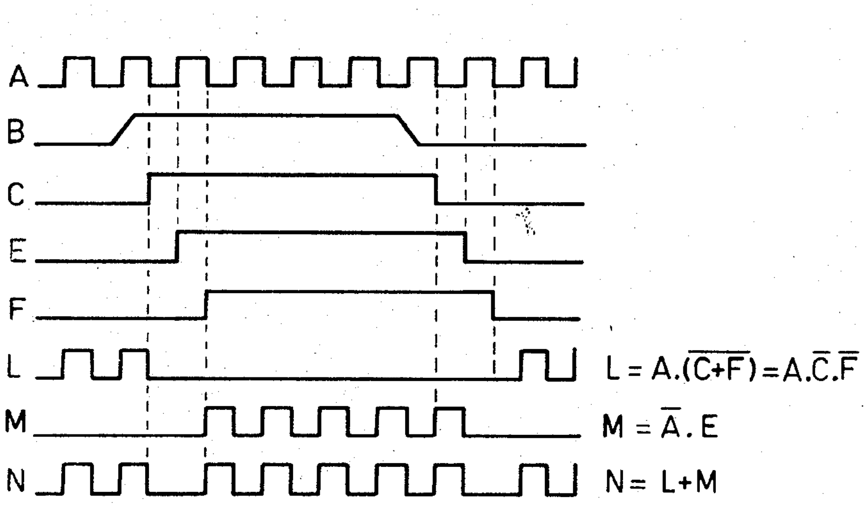
FIG. 4 shows a diagram of the signal forms occurring therein.

FIG. 3 shows a device according to the invention, comprising a bistable element (data flipflop) D3, an inverter I, two logic AND-gates AND2 and AND3, a logic OR-gate OR2 and an output terminal N as the new elements. The logic functions of the respective circuit elements and the signals occurring are shown in FIG. 4. If the signal on terminal B becomes high, the bistable element D1 assumes the corresponding logic state in reaction to the next trailing edge of the signal on terminal A, and the 1-output becomes high and the "O"-output becomes low, so that the logic AND-gate AND2 is blocked and its output L is low. If the 1-output of the bistable element D3 is then also low, the logic AND-gate AND3 is also blocked and its output M is low. Because the switching input of the bistable element D3 is connected to terminal A, via the inverter I, D3 is switched over in reaction to the next leading edge of the signal on terminal A: as a result, the 1-output E or D3 (FIG. 4E) becomes high so that the logic AND-gate AND3 allows passage of the inverted signal arriving on terminal A (FIG. 4M). In reaction to the next trailing edge of the signal on terminal A, the bistable element D2 is switched over, so that its 1-output becomes high and the 0-output becomes low. The logic AND-gate AND2 is thus blocked twice by two low input signals.

If the signal on terminal B becomes low again, the bistable element D1 is switched back in reaction to the next trailing edge of the signal on terminal A, with the result that its 1-output becomes low and its 0-output becomes high. For the logic AND-gate AND2, however, this has no consequences because the 0-output of the bistable element D2 is still low. In reaction to the next leading edge of the signal on terminal A, the bistable element D3 is switched back via the inverter I with the result that its 1-output becomes low and the logic AND-gate AND3 is blocked for the remainder of the signal on terminal A which is inverted by the inverter I. In reaction to the next trailing edge of the signal on terminal A, the bistable element D2 is also switched back, with the result that its 1-output becomes low and its 0-output becomes high. The blocking of the logic AND-gate AND2 is thus terminated. The next pulse on terminal A is then allowed to pass and reaches, via the OR-gate OR2, the output terminal N. It is obvious that in FIG. 4 two phase jumps of 180° each appear in each period of the signal on terminal B. The signal forms of the FIGS. 2 and 4 appear in the conductors and terminals which are denoted by corresponding letters in the figs. 1 and 3, respectively. FIGS.

Figure 5:
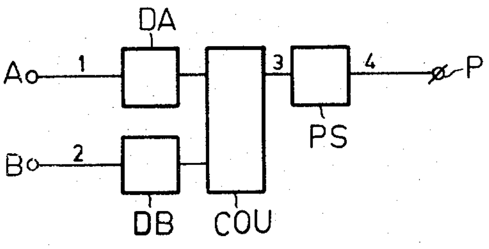
FIG. 5 shows a second embodiment of the device according to the invention.

FIG. 5 shows another device according to the invention. The device comprises two input terminals A and B, like in the FIGS. 1 and 3, a counter COU, two differentiating elements DA and DB, a pulseshaper PS, and an output terminal P. The differentiating element DA differentiates the signal on terminal A (FIG. 6) and applies the result to the count-up input of the counter COU.

Figure 6:
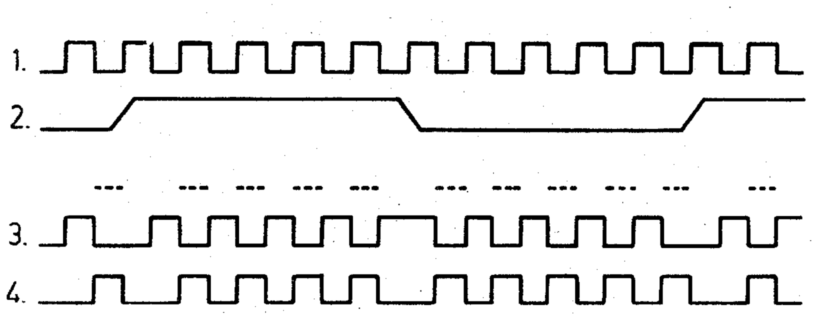
FIG. 6 shows a diagram of the signal forms occurring therein.

The resetting is denoted by horizontal broken lines in FIG. 6.3. The differentiating element DB differentiates the signal on terminal B (FIG. 6.2) and applies the result to the count-down input of the counter COU. The pulses which are generated on the output P under the control of the resetting are shown in FIG. 6.4. The counter signal can also be used as the output signal. This is advantageous in that the phase jumps are then situated at the same distance; however, a drawback is that then longer and shorter pulses also appear instead of only longer and shorter intervals between successive pulses.

Figure 7:
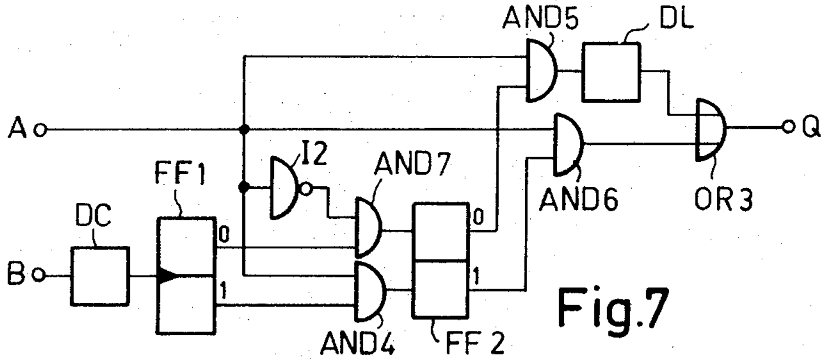
FIG. 7 shows a third embodiment of a device according to the invention.

FIG. 7 shows another embodiment yet according to the invention, comprising two input terminals A and B, one differentiating element DC, two bistable elements FF1 and FF2, one delay element D1, one inverter 12, four logic AND-gates AND4, 5, 6, 7, one logic OR-gate OR3, and one output Q. Assume that the bistable elements FF1 and FF2 are in the reset states, so that their 1-outputs are high. The logic AND-gate AND6 then allows passage of the signals on the input A which, like in FIG. 3, reach the output Q via the logic OR-gate OR3. In reaction to an edge of the signal on terminal B, the bistable element FF1 (T-flipflop) is switched over, with the result that its 1-output becomes low and its 0-output becomes high. If the signal on input A becomes low, the logic AND-gate AND7 receives two high signals, from the bistable element FF1 and from terminal A, via the inverter 12, with the result that it applies a high signal to the bistable element FF2. The latter is then set, with the result that its 1-output becomes low, thus blocking the AND-gate AND6. The 0-output of FF2 becomes high, so that the logic AND-gate AND5 is opened. The next high signal on input A is then applied in delayed fashion to output Q via the logic AND-gate AND5, the delay element DL, and the logic OR-gate OR3. Delay is effected, for example, over a period of time which is slightly longer than the interval between two high signals on input A. The bistable element EF1 is reset again in reaction to the next leading edge of the signal on input B.

In reaction to the next leading edge of the signal on input A the logic AND-gate AND4 receives two high signals, with the result that it supplies a high signal on its output. Consequently, the bistable element FF2 is reset. As a result, the logic AND-gate AND6 is opened and the logic AND-gate AND5 is closed. If the delay time of the delay element DL exceeds the interval between two high signals on terminal A, the output of the delay element DL becomes low only after the output of the logic AND-gate AND6 has already become high. As a result, two high signals are combined to form a longer pulse on the output. It can be stated that a pulse is rendered unrecognizable by another pulse which partly coincides there with, so that it is masked.

The common thought is, therefore, the delay of a part of the pulses, either by a separate delay element or by inversion or by using a counter which counts up and down. At the end the pulse is either suppressed or combined with another pulse, so that it is masked.

What is claimed is:

1. A device for the digital subtraction of first periodic waveforms of a higher frequency and second periodic waveforms of a lower frequency, comprising means for deriving a first trigger pulse extending between the instant of coincidence of a steep portion of a first waveform with the top portion of a second waveform, and the instant of coincidence of the steep portion of a subsequent first waveform with the bottom portion of said second waveform, means for producing a first command pulse corresponding in length to said trigger pulse and delayed about the half-period of said first waveforms with respect to said trigger pulse, means for producing a second command pulse corresponding in length to said trigger pulse and delayed about the half-period of said first waveforms with respect to said first command pulse, means for producing an output train of waveforms corresponding to said first waveforms, means for suppressing an output waveform during the time interval between the leading edges and, respectively, during the interval between the trailing edges of said first and second command pulses, and means for inverting the phase of said ouput waveforms during the time interval of said second command pulse.

2. A device as claimed in claim 1, wherein said means for producing said first and second command pulses include bistable elements responsive to the coincidence of waveforms of higher frequency with waveforms of lower frequency, said output waveforms providing means being blocking means connected to the input of the waveforms of higher frequency and controlled by outputs of said bistable elements to introduce a time delay which corresponds substantially to the half period of the waveforms of higher frequency.

3. A device as claimed in claim 1, wherein said first and second command pulses are output signals from two differentiating circuits operable for receiving said input waveforms, respectively, and said output waveforms providing means including a binary counter operable for counting up in response to the differentiated signals of higher frequency and, respectively, for counting down in response to the differentiated signals of lower frequency, and means for providing an output signal corresponding to the resetting of said counter.

* * * * *